US008619732B2

(12) United States Patent
Khairmode et al.

(10) Patent No.: US 8,619,732 B2
(45) Date of Patent: Dec. 31, 2013

(54) METHOD AND APPARATUS FOR ENABLING COEXISTENCE OF PLURALITY OF COMMUNICATION TECHNOLOGIES ON COMMUNICATION DEVICE

(75) Inventors: Vijay Khairmode, Santa Clara, CA (US); Murali Padmanabhan, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 927 days.

(21) Appl. No.: 12/380,338

(22) Filed: Feb. 26, 2009

(65) Prior Publication Data

US 2009/0219904 A1 Sep. 3, 2009

(30) Foreign Application Priority Data

Feb. 28, 2008 (IN) .............................. 499/CHE/2008

(51) Int. Cl.
*H04W 4/00* (2009.01)
(52) U.S. Cl.
USPC .......................................... 370/338; 370/466
(58) Field of Classification Search
USPC .................. 370/328, 329, 338, 465, 466, 467
See application file for complete search history.

(56) References Cited

U.S. PATENT DOCUMENTS

| | | | |
|---|---|---|---|
| 2008/0037501 A1* | 2/2008 | Ali et al. ........................ | 370/342 |
| 2008/0192770 A1* | 8/2008 | Burrows et al. ............... | 370/466 |
| 2008/0205365 A1* | 8/2008 | Russell et al. ................. | 370/341 |
| 2009/0003278 A1* | 1/2009 | Abdel-Kader et al. ........ | 370/331 |
| 2009/0047991 A1* | 2/2009 | Elg .............................. | 455/552.1 |
| 2009/0082017 A1* | 3/2009 | Chang et al. ................. | 455/435.2 |

OTHER PUBLICATIONS

Yigal Bitron, Having efficient WiMAX, Bluetooth and WiFi in Handsets, *EETimes-India.*

* cited by examiner

*Primary Examiner* — Brian D Nguyen
(74) *Attorney, Agent, or Firm* — Sterne, Kessler, Goldstein & Fox P.L.L.C.

(57) ABSTRACT

A method and apparatus for enabling coexistence of a plurality of communication technologies on a communication device is provided. The method includes receiving one or more first communication events from a first communication technology of the plurality of communication technologies. The method further includes converting the one or more first communication events to one or more second communication events for one or more second communication technologies of the plurality of communication technologies. Converting emulates one or more first peer to peer communication links of the one or more first communication technologies as one or more second peer to peer communication links of the one or more second communication technologies.

44 Claims, 10 Drawing Sheets ically to wireless communication networks and more specifically to providing method and system for enabling coexistence of a plurality of communication technologies on a communication device.

METHOD AND APPARATUS FOR ENABLING COEXISTENCE OF PLURALITY OF COMMUNICATION TECHNOLOGIES ON COMMUNICATION DEVICE

BACKGROUND OF THE INVENTION

The present invention relates generally to wireless communication networks and more specifically to providing method and system for enabling coexistence of a plurality of communication technologies on a communication device.

Wireless communication cover various types of services like radio frequency communication, microwave communication and short range communication. Over the years, wireless communication devices have evolved from simple devices like cellular phones and pagers to multi-radio devices having greater communication capabilities. A multi-radio device supports a plurality of communication technologies.

However, simultaneous use of a plurality of radios associated with the plurality of communication technologies by a multi-radio device causes performance problems, for example, interference. This interference is caused in the multi-radio device when each of the plurality of radios operate in adjacent/overlapping frequency bands/channels. As a result of this interference, a transceiver of the co-located transceivers in the multi-radio device fail to distinguish between, a desired signal meant for its own processing and an undesired signal meant for processing by a co-located transceiver. Consequently, such interference causes degradation of quality of service, for example, poor quality of voice, errors in data sent/received, and complete loss of a communication link.

Some of the existing technologies use RF filters to reduce the effects of this interference. However, the selectivity of such RF filters is generally poor. Moreover, the cost involved in manufacturing a high selectivity RF filter is very high.

There is therefore a need for method and system that mitigates interference on a communication device that supports a plurality of communication technologies.

BRIEF DESCRIPTION OF DRAWINGS

A more complete description of the invention is provided by reference to the following detailed description when considered in conjunction with the accompanying drawings in which reference symbols indicate the same or similar components, wherein.

DETAILED DESCRIPTION OF THE DRAWINGS

Figure 1:
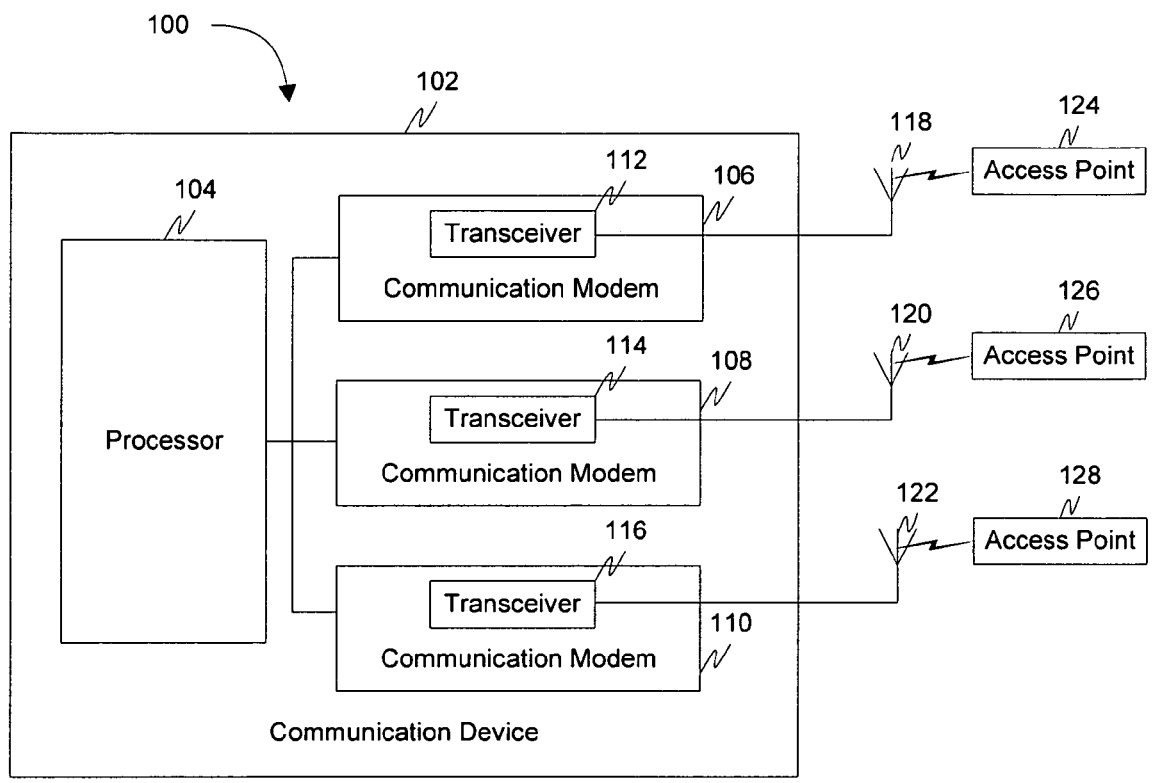
FIG. 1 is a block diagram showing an environment (that is exemplary) in which various embodiments of the invention can function.

Before describing in detail embodiments that are in accordance with the invention, it should be observed that the embodiments reside primarily in combinations of method steps and apparatus components related to a method and system for enabling coexistence of a plurality of communication technologies on communication device.

Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

Various embodiments of the invention provide methods and systems for enabling coexistence of a plurality of communication technologies on a communication device. A method includes receiving one or more first communication events from one or more first communication technologies of the plurality of communication technologies. The method further includes converting the one or more first communication events to one or more second communication events of one or more second communication technologies of the plurality of communication technologies.

The wireless communication technologies comprise one or more of Worldwide Interoperability for Microwave Access (WiMAX), Wireless Metropolitan Area Network (WMAN), Wireless Local Area Network (WLAN), and Bluetooth.

FIG. 1 is a block diagram showing an environment 100 (that is exemplary) in which various embodiments of the invention may function. Environment 100 includes a communication device 102. Examples of communication device 102 may include, but are not limited to a Personal Digital Assistant (PDA), a mobile phone, a laptop, a Customer Premises Equipment (CPE), and a personal computer. Communication device 102 includes a processor 104 and one or more communication modems (for example, a communication modem 106, a communication modem 108, and a communication modem 110). Processor 104 is operatively coupled to the one or more communication modems. Further, each of the one or more communication modems uses different communication technologies. Examples of the communication technologies may include, but are not limited to a Worldwide Interoperability for Microwave Access (WiMAX), a Wireless Metropolitan Area Network (WMAN), a Bluetooth, and a Wireless Local Area Network (WLAN). For example, communication modem 106 may be a WiMAX modem that operates in Radio Frequency (RF) spectrum of 2.3 GHz-2.4 GHz, 2.5 GHz-2.7 GHz, and 3.3 GHz-3.8 GHz, communication modem 108 may be a Bluetooth modem that operates in a RF spectrum of 2.4 GHz, and communication modem 110 may be a WLAN modem that operates in a RF spectrum of 2.4 GHz and 5 GHz.

Each of the one or more communication modems are also connected with each other through one or more connections and exchange information over the one or more connections. Examples of the information may include but are not limited to, a priority of current or planned operations, a state of current or planned operations, a duration of current or planned operations, a DL sub-frame timing, an UL sub-frame timing, a beacon period timing, a request for operation, a grant for operation, a modem activity indication, an enhanced Synchronous Connection Oriented (eSCO) reserved slot timing indication, a eSCO retransmission slot timing indication, an enhanced SCO retransmission Window (WeSCO) interval timing indication, an enhanced Synchronous Connection Oriented periodicity (TeSCO) interval timing indication, a Synchronous Connection Oriented (SCO) slots timing indication, a Synchronous Connection Oriented periodicity (TSCO) interval timing indication, a Transmission (Tx) slot timing indication, and a Reception (Rx) slot timing indication.

Each of the one or more communication modems includes one or more transceivers. For example, communication modem 106 includes a transceiver 112, communication modem 108 includes a transceiver 114, and communication modem 110 includes a transceiver 116. Further, each of the one or more transceivers includes zero or more antennas. For example, transceiver 112 includes an antenna 118, transceiver 114 includes an antenna 120, and transceiver 116 includes an antenna 122. The one or more communication modems communicate with one or more access points using the one or more antennas of the one or more transceivers. For example, communication modem 106 communicates with an access point 124 using antenna 118, communication modem 108 communicates with an access point 126 using antenna 120, and communication modem 110 communicates with an access point 128 using antenna 122. An access point of the one or more access points may be one of a WiMAX base station, a WLAN access point, and a Bluetooth peer (for example, a Bluetooth headset or a personal computer with a Bluetooth modem) based on a communication technology used by a communication modem of the one or more communication modems communicating with the access point.

Additionally, a communication link established between a communication modem of the one or more communication modems and an access point of the one or more access points is a peer to peer communication link. This peer to peer communication link is a real peer to peer communication link of the communication modem with the access point. Therefore, the communication modem and the access point communicate with each other as peer devices. For example, when communication modem 106 is a WiMAX modem, access point 124 is WiMAX base station. In this case, a communication link between communication modem 106 and access point 124 is a WiMAX peer to peer communication link. By way of another example, when communication modem 108 is a Bluetooth modem, access point 126 is a Bluetooth headset. In this case, communication link between communication modem 108 and access point 126 is a Bluetooth peer to peer communication link. By way of yet another example, when communication modem 110 is a WLAN modem, access point 128 is a WLAN access point. In this case, communication link between communication modem 110 and access point 128 is a WLAN peer to peer communication link.

Figure 2:
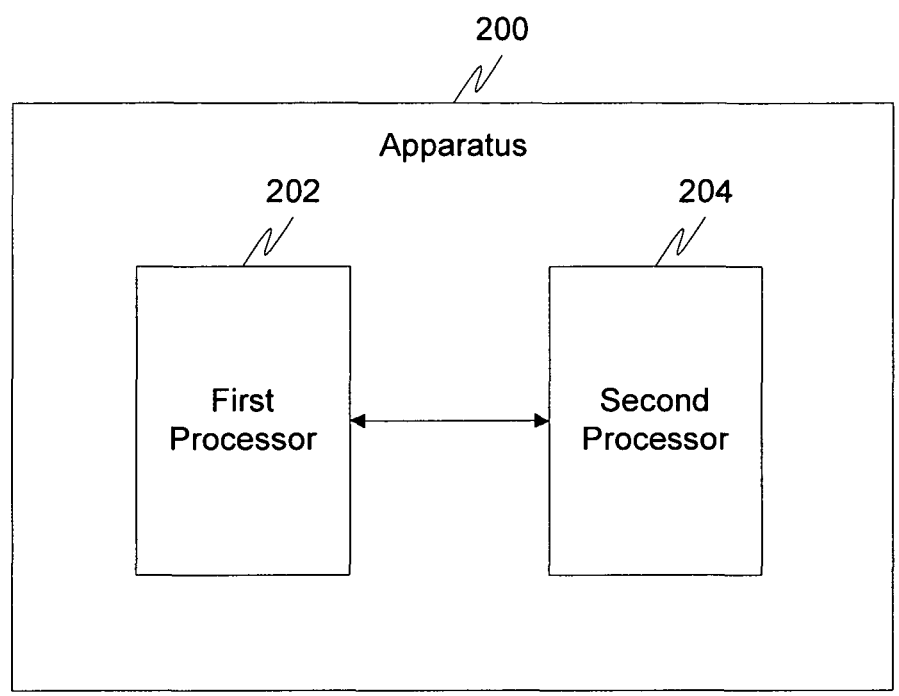
FIG. 2 is a block diagram showing an apparatus for enabling coexistence of a plurality of communication technologies, in accordance with an embodiment of the invention.

FIG. 2 is a block diagram showing an apparatus 200 for enabling coexistence of a plurality of communication technologies, in accordance with an embodiment of the invention.

Apparatus 200 may be a mobile station communicating with a base station for transmitting and receiving voice and data traffic. Examples of a mobile station may include, but are not limited to a PDA, a mobile radio, a mobile telephone, a Customer Premises Equipment (CPE), and a mobile computer. Alternatively, apparatus 200 may be a base station or any network entity. Apparatus 200 supports the plurality of communication technologies for transmission and reception of communication data. Examples of the plurality of communication technologies may include, but are not limited to WiMAX, WLAN, WMAN, and Bluetooth.

Apparatus 200 includes a first processor 202 and a second processor 204, which is operatively coupled with first processor 202. Each of first processor 202 and second processor 204 is associated with one or more second communication technologies of the plurality of communication technologies. Examples of first processor 202 and second processor 204 may include, but are not limited to a Central Processing Unit (CPU), a microprocessor, a controller, and a Digital Signal Processor (DSP). First processor 202 receives one or more first communication events from one or more first communication technologies of the plurality of communication technologies. The one or more first communication events may be one or more first peer to peer communication events associated with the one or more first communication technologies. A first peer to peer communication event of the one or more first peer to peer communication events may be one of, but is not limited to timing of a Downlink (DL) sub-frame and timing of an Uplink (UL) sub-frame. For example, if the first communication technology is WiMAX, the one or more first peer to peer communication events may be a WiMAX peer to peer communication event.

Each first communication event of the one or more first communication events may include one or more of a timing signal, a communication message, a communication parameter, and a communication procedure. When the first communication technology is WiMAX, the communication message may be one or more of a Mobile Sleep Request (MOB_SLP-REQ), a Mobile Sleep Response (MOB_SLP-RSP), a Mobile Scan Request (MOB_SCN-REQ), and a Mobile Scan Response (MOB_SCAN-RSP). Therefore, the one or more first communication events include information regarding one or more active periods of a first communication technology of the one or more first communication technologies.

An active period of a communication technology is the time duration for which the communication technology may perform communication on one or more peer to peer communication links of the communication technology. Therefore, an active period of the one or more active periods is the time duration for which the first communication technology may schedule communication on one or more first peer to peer communication links of the first communication technology. The one or more active periods may be determined based on a sleep mode associated with the first communication technology of the one or more first communication technologies. For example, when the first communication technology is WiMAX, a first communication event includes a sleep mode message, for example, MOB_SLP-REQ and a MOB_SLP-RSP. The sleep mode message indicates that one or more of a DL sub-frame and a UL sub-frame of WiMAX are active periods. Further, a set of three contiguous WiMAX frames includes a first frame, a second frame, and a third frame in the same order. WiMAX sleep mode can be setup such that a communication device supporting WiMAX may use only a first DL sub-frame of the first frame and a second UL sub-frame of the second frame to perform communication on one or more WiMAX peer to peer communication links. The first DL sub-frame and the second UL sub-frame represent the active periods of WiMAX. However, the communication device does not perform communication in a first UL sub-frame of the first frame, a second DL sub-frame of the second frame, a third DL sub-frame of the third frame, and a third UL sub-frame of the third frame. Therefore, the first UL sub-frame, the second DL sub-frame, the third DL sub-frame, and the third UL sub-frame represent the inactive periods of WiMAX. An inactive period of a communication technology is the time duration for which the communication technology may not perform communication on one or more peer to peer communication links of the communication technology.

First processor 202 communicates the one or more first communication events to second processor 204. Thereafter, second processor 204 converts the one or more first communication events to one or more second communication events associated with the one or more second communication technologies. A second communication event of the one or more second communication events may be one or more second peer to peer communication events associated with the one or more second communication technologies. For example, if Bluetooth is the second communication technology, then the one or more second communication events may be a Bluetooth peer to peer communication event.

Each of the one or more second communication events may be one of, but is not limited to an eSCO slot pair and a SCO slot pair. Additionally, each second communication event of the one or more second communication events may be one or more of a timing signal, a communication message, a communication parameter, and a communication procedure. When the second communication technology is Bluetooth, the communication message may be one or more of a Link Manager Protocol Synchronous Connection Oriented Link Set Up Request (LMP_SCO_link_req), a Link Manager Protocol Synchronous Connection Oriented Link Remove Request (LMP_remove_SCO_link_req), a Link Manager Protocol Enhanced Synchronous Connection Oriented Link Set Up Request (LMP_eSCO_ink_req), and a Link Manager Protocol Enhanced Synchronous Connection Oriented Link Remove Request (LMP_remove_eSCO_link_req).

Conversion of the one or more first communication events to the one or more second communication events emulates one or more first peer to peer communication links of the one or more first communication technologies as one or more emulated second peer to peer communication links of the one or more second communication technologies. Therefore, in addition to one or more real peer to peer communication links, each of the one or more second communication technologies may have one or more emulated second peer to peer communication links. The one or more second communication events generated after conversion are discarded by the one or more second communication technologies for communication on one or more second peer to peer communication links of the one or more second communication technology. By way of an example, the first communication technology is WiMAX and the second communication technology is Bluetooth. In a first scenario, a sleep mode set up on a WiMAX peer to peer communication link is converted into one or more SCO/eSCO link setup. Examples of the sleep mode set up may include, but are not limited to a MOB_SLP-REQ message, and a MOB_SLP-RSP message. Examples of SCO/eSCO link set up may include, but are not limited to a LMP_eSCO_link_req message, and a LMP_remove_eSCO_link_req message. This conversion emulates the WiMAX peer to peer communication link as an emulated Bluetooth peer to peer communication link. In a second scenario, a WiMAX communication event (for example, a DL sub-frame and a UL sub-frame) received on a WiMAX peer to peer communication link is converted into a Bluetooth communication event (for example, one or more eSCO slot pairs). This conversion emulates the WiMAX peer to peer communication link as an emulated Bluetooth peer to peer communication link. Therefore, the Bluetooth communication event generated after conversion is discarded by Bluetooth for communication on one or more Bluetooth peer to peer communication links, as it is treated as a reserved Bluetooth communication event.

After conversion, based on the one or more second communication events, one or more active periods of a second communication technology of the one or more second communication technologies are automatically aligned relative to the one or more active periods of the first communication technology. This ensures that the one or more active periods of the first communication technology do not interfere with the one or more active periods of the second communication technology. Because of this, there is no interference between the first communication technology and the second communication technology.

The automatic alignment is enabled as the second communication technology manages communication on one or more real peer to peer communication links of the second communication technology and one or more emulated peer to peer communication links of the second communication technology using a native method. Therefore, the second communication technology treats the one or more active periods of the first communication technology on the one or more emulated peer to peer communication links as reserved communication slots. Accordingly, the second communication technology allocates the one or more active periods of the second communication technology on the one or more real peer to peer communication links to avoid interference with the reserved communication slots of the one or more emulated peer to peer communication links.

The native method may be one or more of a link setup, a link renegotiation, and a link removal. They may be performed to change one or more link parameters associated with the second communication technology. Examples of link parameters may include, but are not limited to a Synchronous Connection Oriented offset (DSCO), an enhanced Synchronous Connection Oriented offset (DeSCO), an enhanced Synchronous Connection Oriented Interval (TeSCO), an enhanced Synchronous Connection Oriented Retransmission Window (WeSCO), a Master to Slave eSCO packet type, a Slave to Master eSCO packet type, a Mater to Slave packet length, and a Slave to Master packet length. This is further explained in conjunction with FIG. 4.

For example, the first communication technology is WiMAX and the second communication technology is Bluetooth. WiMAX uses a set of three contiguous WiMAX frames on a WiMAX peer to peer communication link. The WiMAX peer to peer communication link is converted to an emulated Bluetooth peer to peer communication link. The set of three contiguous WiMAX frames includes a first frame, a second frame, and a third frame in the same order. A communication device supporting WiMAX may use a first DL sub-frame of the first frame and a second UL sub-frame of the second frame to perform communication on the WiMAX peer to peer communication link. The first DL sub-frame and the second UL sub-frame represent the active periods of WiMAX. The one or more active periods of Bluetooth are automatically aligned relative to one or more of the first DL sub-frame and the second UL sub-frame on a real Bluetooth peer to peer communication link, such that, one or more of the first DL sub-frame and the second UL sub-frame do not coincide with the one or more active periods of Bluetooth.

The automatic alignment is enabled as Bluetooth handles communication on the emulated Bluetooth peer to peer communication link and the real Bluetooth peer to peer communication link using a Bluetooth native method. Therefore, Bluetooth treats the one or more active periods of WiMAX as reserved Bluetooth slots. This facilitates in removing interference between Bluetooth and WiMAX.

After the automatic alignment of the one or more active periods of the one or more first communication technologies to the one or more active periods of the one or more second communication technologies, second processor 204 automatically schedules communication of the second communication technology in one or more active periods of the second communication technology using the native method on one or more second peer to peer communication links of the second communication technology. When the second communication technology is Bluetooth, second processor 204 allocates one of Synchronous Connection Oriented (SCO) slots and enhanced Synchronous Connection Oriented (eSCO) slots in one or more inactive periods of the first communication technology. This is further explained in conjunction with FIG. 5.

In an alternate embodiment, during conversion second processor 204 creates one or more allocation subsequences based on the one or more first communication events. Thereafter, second processor 204 divides the one or more allocation subsequences into a plurality of communication instances of predetermined time durations. Second processor 204 then allocates the plurality of communication instances to at least one of one or more of the one or more first communication technologies and one or more of the one or more second communication technologies based on a predefined criteria. In an embodiment, the predefined criteria is one or more of a communication protocol requirement and an application service requirement of one or more of the one or more first communication technology and the one or more second communication technology. Additionally, the predefined criteria may be a communication priority requirement of one or more of the one or more first communication technology and the one or more second communication technology. This is further explained in conjunction with FIG. 7.

Thereafter, second processor 204 creates an allocation sequence to specify the order of executing the one or more allocation subsequences based on a predetermined criteria. The predetermined criteria may be a priority associated with one or more of the one or more first communication technologies and the one or more second communication technologies. For example, second processor 204 may create an allocation sequence to ensure that Bluetooth is allocated at least one communication instance every 7.5 ms in order to use TeSCO=12 for communicating with a peer Bluetooth device.

It will apparent to a person skilled in the art that the one or more first communication technologies may create the allocation sequence and communicate to second processor 204. It will also be apparent to a person skilled in the art that different processors may be used for converting the one or more first communication events to one or more second communication events and for creating the one or more allocation subsequences.

Additionally, second processor 204 may overallocate one or more resources to at least one of one or more of the one or more first communication technologies and one or more of the one or more second communication technologies. The one or more resources may be time duration. For example, in WiMAX a voice packet may be allocated once in every four contiguous frames periodically over WiMAX. Each frame has a time duration of 5 ms. Therefore, for 12 contiguous frames, for DL transmissions a voice packet is allocated to a DL sub-frame (DL1) of a first frame and subsequently to a DL sub-frame (DL5) of a fifth frame, and a DL sub-frame (DL9) of a ninth frame in the 12 contiguous frames. The time duration between DL1 and DL5, and DL5 and DL9 is 20 ms each, which corresponds to four WiMAX frames. In the same manner, for uplink transmission, a voice packet will be allocated to an UL sub-frame (UL2) of a second frame, an UL sub-frame (UL6) of a sixth frame, and an UL sub-frame (UL10) of a tenth frame in the 12 contiguous frames. Additionally for Bluetooth, a voice packet over Bluetooth having a TeSCO of value 12 is allocated once in every 12 contiguous Bluetooth slots. The time duration of each Bluetooth slot is 0.625 ms. This periodicity for WiMAX and Bluetooth may lead to interference between the voice communication over WiMAX and the voice communication over Bluetooth during their coexistence irrespective of relative offset between the WiMAX frames and Bluetooth slot timings.

In order to remove this, one or more resources may be overallocated to WiMAX. The one or more resources may be one or more of time duration and frequency. For example, WiMAX may be allowed to communicate a voice packet once in every three contiguous frames instead four contiguous frames. This may ensure that no interference happens between WiMAX and Bluetooth when Bluetooth has a TeSCO value of 12. Additionally, to facilitate non-interference, WiMAX peer to peer communication link may be emulated as Bluetooth peer to peer communication link. One or more of the one or more resources overallocated to WiMAX may not be used for actual transmission of voice packets. Alternatively, one or more of the one or more resources which has been overallocated, may be used to provide other services or to retransmit the voice packets.

In the same manner, one or more of the first communication technologies and the second communication technologies may over-request for resources to ensure that there is no interference between them. For example, WiMAX may periodically over-request for allocation of a voice packet once in every three frames instead of once in every four frames. When WLAN is the second communication technology, WLAN may periodically over-request for resources by over-polling WLAN access point. WLAN may perform over-polling to request data from the WLAN access point.

In an embodiment, second processor 204 may determine the one or more active periods of the one or more first communication technologies based on information relating to the one or more second communication technologies. The one or more second communication technology of the one or more second communication technologies may provide the information to second processor 204. When a second communication technology of the one or more second communication technologies is WLAN, the information may include one or more of a timing of a beacon signal and a periodicity of the beacon signal associated with the second communication technology. This information may indicate one or more inactive periods of the second communication technology.

Figure 3:
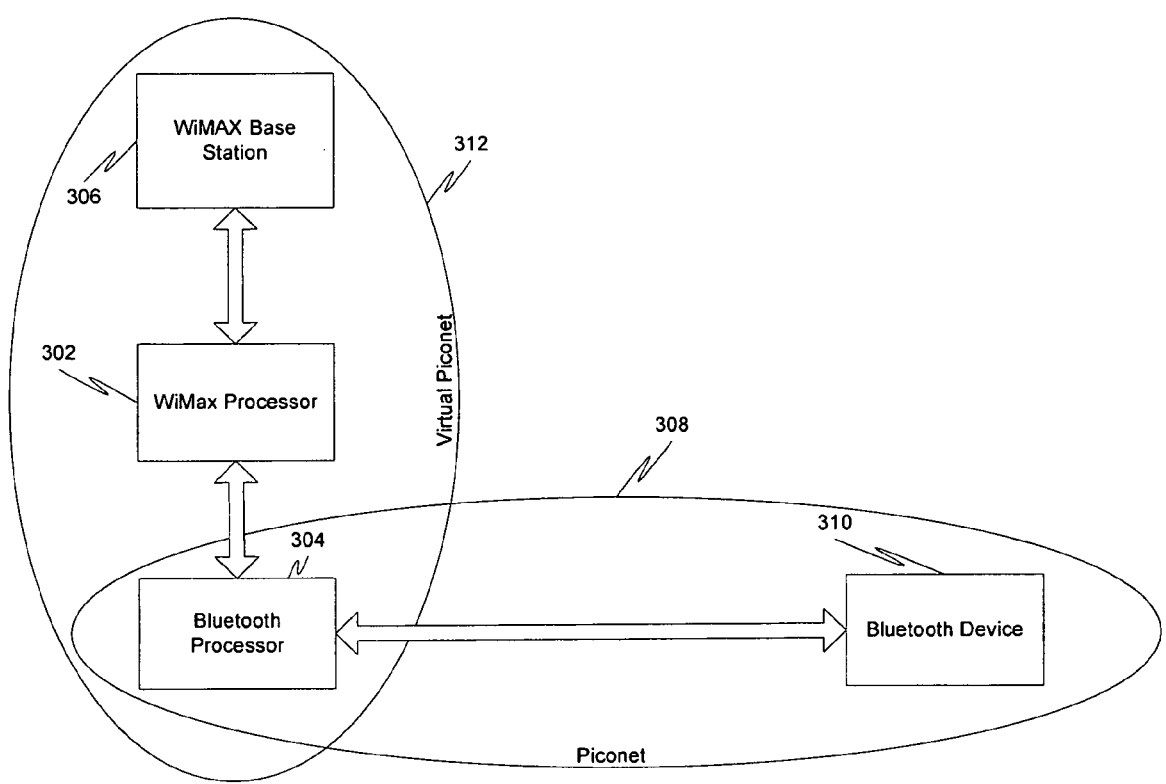
FIG. 3 is a block diagram illustrating coexistence of WiMAX and Bluetooth on a mobile station, in accordance with an exemplary embodiment of the invention.

FIG. 3 is a block diagram illustrating coexistence of WiMAX and Bluetooth on a mobile station, in accordance with an exemplary embodiment of the invention. As shown in the FIG. 3, a WiMAX processor 302 is operatively coupled with a Bluetooth processor 304, and a WiMAX Base station 306. Bluetooth processor 304 forms a piconet 308 with a Bluetooth device 310 for communication. In piconet 308, Bluetooth processor 304 is the master and Bluetooth device 310 is the slave. Alternatively, Bluetooth processor 304 may be the slave and Bluetooth device 310 may be the master. It will be apparent to a person skilled in the art that Bluetooth processor 304 can form a plurality of piconets with a plurality of Bluetooth devices. Examples of Bluetooth device 310 may include, but are not limited to a Bluetooth headset, a Bluetooth portable terminal, and a Bluetooth enabled personal computer.

WiMAX processor 302 generates a WiMAX communication event. The WiMAX communication event may be generated based on a message received from WiMAX base station 306. Thereafter, WiMAX processor 302 communicates the WiMAX communication event to Bluetooth processor 304. Bluetooth processor 304 converts the WiMAX communication event, such that, the converted WiMAX communication event is treated as a Bluetooth communication event. This conversion emulates WiMAX peer to peer communication link between WiMAX processor 302 and WiMAX base station 306 as an emulated Bluetooth peer to peer communication link. The conversion may be a full conversion or a partial conversion. This facilitates Bluetooth processor 304 to treat WiMAX processor 302/WiMAX base station 306 as a virtual Bluetooth device. Therefore, Bluetooth processor 304 handles the WiMAX communication event as if it is was transmitted from a peer Bluetooth device. The emulation of WiMAX processor 302/WiMAX base station 306 as the virtual Bluetooth device facilitates in setting up a virtual piconet 312 between Bluetooth processor 304, WiMAX processor 302, and WiMAX base station 306. In virtual piconet 312, WiMAX processor 302/WiMAX base station 306 acts as the master and Bluetooth processor 304 acts as the slave.

Figure 4:
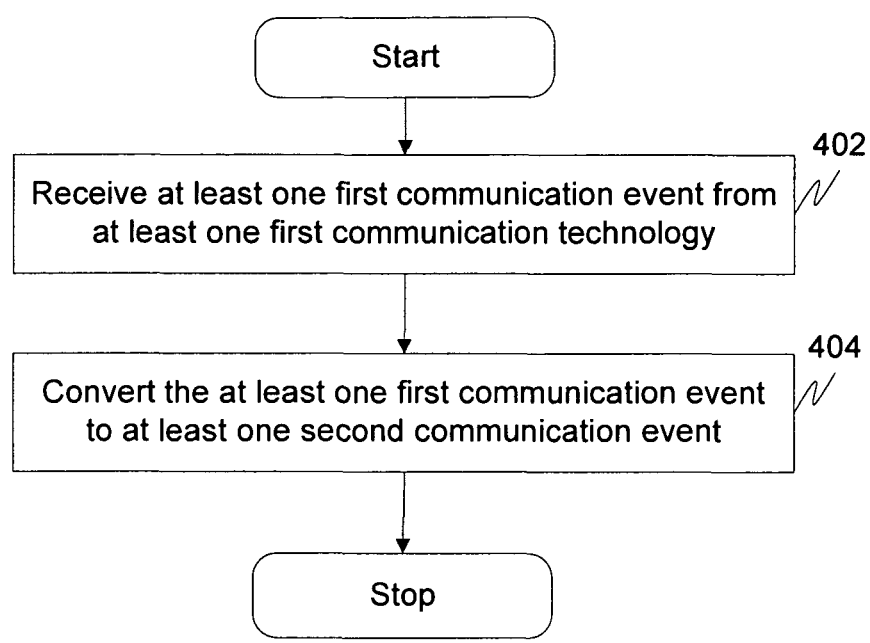
FIG. 4 is a flowchart of a method for enabling coexistence of a plurality of communication technologies, in accordance with an embodiment of the invention.

FIG. 4 is a flowchart of a method for enabling coexistence of a plurality of communication technologies, in accordance with an embodiment of the invention. Examples of the plurality of communication technologies may include, but are not limited to WiMAX, WMAN, WLAN, and Bluetooth. At step 402, first processor 202 receives one or more first communication events from one or more first communication technologies of the plurality of communication technologies. In an example, when the first communication technology is WiMAX, first processor 202 receives a WiMAX communication event. The one or more first communication events may be one or more first peer to peer communication events associated with the one or more first communication technologies. A first peer to peer communication event of the one or more first peer to peer communication events may be one of, but is not limited to timing of a Downlink (DL) sub-frame and timing of an Uplink (UL) sub-frame. For example, if the first communication technology is WiMAX, the one or more first peer to peer communication events may be a WiMAX peer to peer communication event.

Each first communication event of the one or more first communication events may include one or more of a timing signal, a communication message, a communication parameter, and a communication procedure. When the first communication technology is WiMAX, the communication message may be one or more of a Mobile Sleep Request (MOB_SLP-REQ), a Mobile Sleep Response (MOB_SLP-RSP), a Mobile Scan Request (MOB_SCN-REQ), and a Mobile Scan Response (MOB_SCAN-RSP). Therefore, the one or more first communication events include information regarding one or more active periods of a first communication technology of the one or more first communication technologies. An active period of the one or more active periods is the time duration for which the first communication technology may perform communication on one or more first peer to peer communication links of the first communication technology. For example, if the first communication technology is WiMAX, first processor 202 may receive a timing signal as a first communication event. The timing signal may indicate one or more active periods of WiMAX.

First processor 202 communicates the one or more first communication events to second processor 204. Thereafter, at step 404, second processor 204 converts the one or more first communication events to one or more second communication events associated with the one or more second communication technologies. Conversion of the one or more first communication events to the one or more second communication events emulates one or more first peer to peer communication links of the one or more first communication technologies as one or more emulated second peer to peer communication links of the one or more second communication technologies. Therefore, in addition to one or more real peer to peer communication links, each of the one or more second communication technologies may have one or more emulated peer to peer communication links. The one or more second communication events generated after conversion are discarded by the one or more second communication technologies for communication on one or more second peer to peer communication links of the one or more second communication technology. This has already been explained in detail in conjunction with FIG. 2.

After converting the one or more first communication events as one or more second communication events, one or more active periods of a second communication technology of the one or more second communication technologies are automatically aligned relative to the one or more active periods of the first communication technology. This ensures that the one or more active periods of the first communication technology do not interfere with the one or more active periods of the second communication technology. Because of this, there is no interference between the first communication technology and the second communication technology.

The automatic alignment is enabled as the second communication technology manages communication on one or more real peer to peer communication links of the second communication technology and one or more emulated peer to peer communication links of the second communication technology using a native method. Therefore, the second communication technology treats the one or more active periods of the first communication technology on the one or more emulated peer to peer communication links as reserved communication slots. Accordingly, the second communication technology allocates the one or more active periods of the second communication technology on the one or more real peer to peer communication links to avoid interference with the reserved communication slots.

The native method may be one or more of a link setup, a link renegotiation, and a link removal. They may be performed to change one or more link parameters associated with the second communication technology. Examples of link parameters may include, but are not limited to a Synchronous Connection Oriented offset (DSCO), an enhanced Synchronous Connection Oriented offset (DeSCO), an enhanced Synchronous Connection Oriented Interval (TeSCO), an enhanced Synchronous Connection Oriented Retransmission Window (WeSCO), a Master to Slave eSCO packet type, a Slave to Master eSCO packet type, a Mater to Slave packet length, and a Slave to Master packet length.

For example, the first communication technology is WiMAX and the second communication technology is Bluetooth. WiMAX uses a set of three contiguous WiMAX frames on a WiMAX peer to peer communication link. The WiMAX peer to peer communication link is emulated as emulated Bluetooth peer to peer communication link. The set of three contiguous WiMAX frames includes a first frame, a second frame, and a third frame in the same order. A communication device supporting WiMAX may use a first DL sub-frame of the first frame and a second UL sub-frame of the second frame to perform communication on the WiMAX peer to peer communication link. The first DL sub-frame and the second UL sub-frame represent the active periods of WiMAX. The one or more active periods of Bluetooth are automatically aligned relative to one or more of the first DL sub-frame and the second UL sub-frame on a real Bluetooth peer to peer communication link, such that, one or more of the first DL sub-frame and the second UL sub-frame do not coincide with the one or more active periods of Bluetooth.

The automatic alignment is enabled as Bluetooth handles communication on the emulated Bluetooth peer to peer communication link and the real Bluetooth peer to peer communication link using a Bluetooth native method. Therefore, Bluetooth treats the one or more active periods of WiMAX as reserved Bluetooth slots. This facilitates in removing interference between Bluetooth and WiMAX.

Figure 5:
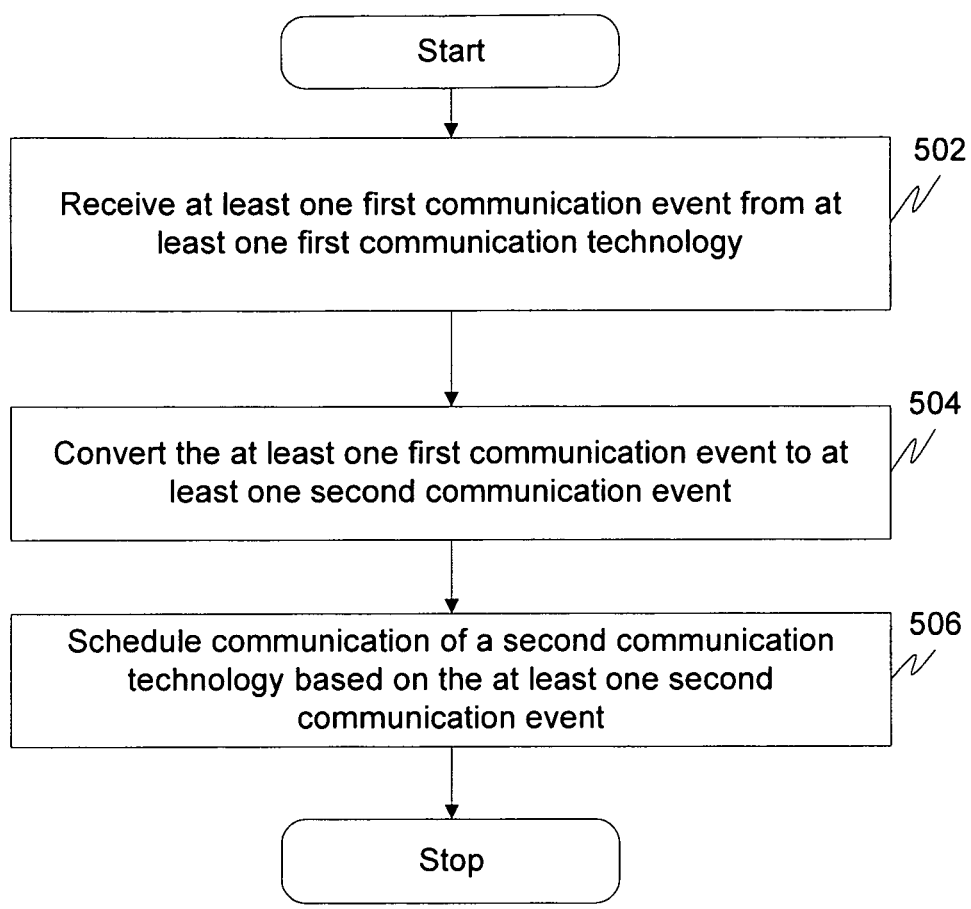
FIG. 5 is a flowchart of a method for enabling coexistence of a plurality of communication technologies, in accordance with an embodiment of the invention.

FIG. 5 is a flowchart of a method for enabling coexistence of a plurality of communication technologies, in accordance with an embodiment of the invention. At step 502, first processor 202 receives one or more first communication events from one or more first communication technologies of the plurality of communication technologies. First processor 202 communicates the one or more first communication events to second processor 204. At step 504, second processor 204 converts the one or more first communication events to one or more second communication events associated with the one or more second communication technologies. This has already been explained in conjunction with FIG. 4

At step 506, second processor 204 schedules communication of a second communication technology of the one or more second communication technologies in the one or more active periods of the second communication technology. For example, a first communication technology of the one or more first communication technologies is WiMAX. In this example, WiMAX uses a structure of three contiguous WiMAX frames, which include a first frame, a second frame, and a third frame in the same order. A communication device supporting WiMAX may use a first DL sub-frame of the first frame and a second UL sub-frame of the second frame to perform communication with a peer WiMAX device. The first DL sub-frame and the second UL sub-frame represent the active periods of WiMAX. However, the communication device does not perform communication with its peer in a first UL sub-frame of the first frame, a second DL sub-frame of the second frame, a third DL sub-frame of the third frame, and a third UL sub-frame of the third frame. The second communication technology is Bluetooth, therefore, second processor 204 converts the first DL sub-frame and the second UL sub-frame to one of one or more eSCO slot pairs and one or more SCO slot pairs. After converting, Bluetooth treats the first DL sub-frame and the second UL sub-frame as one of one or more eSCO slot pairs and one or more SCO slot pair that are to be discarded for communication over a Bluetooth peer to peer communication link. Thus, Bluetooth does not perform communication during time duration of the first DL sub-frame and the second UL sub-frame. Second processor 204 schedules Bluetooth communication during time duration of one or more of the first UL sub-frame, the second DL sub-frame, the third DL sub-frame, and the third UL sub-frame. Second processor 204 can schedule Bluetooth voice data using one of a SCO link and an eSCO link. Also, second processor 204 can also schedule data using Asynchronous Connection Less (ACL) link.

Figure 6:
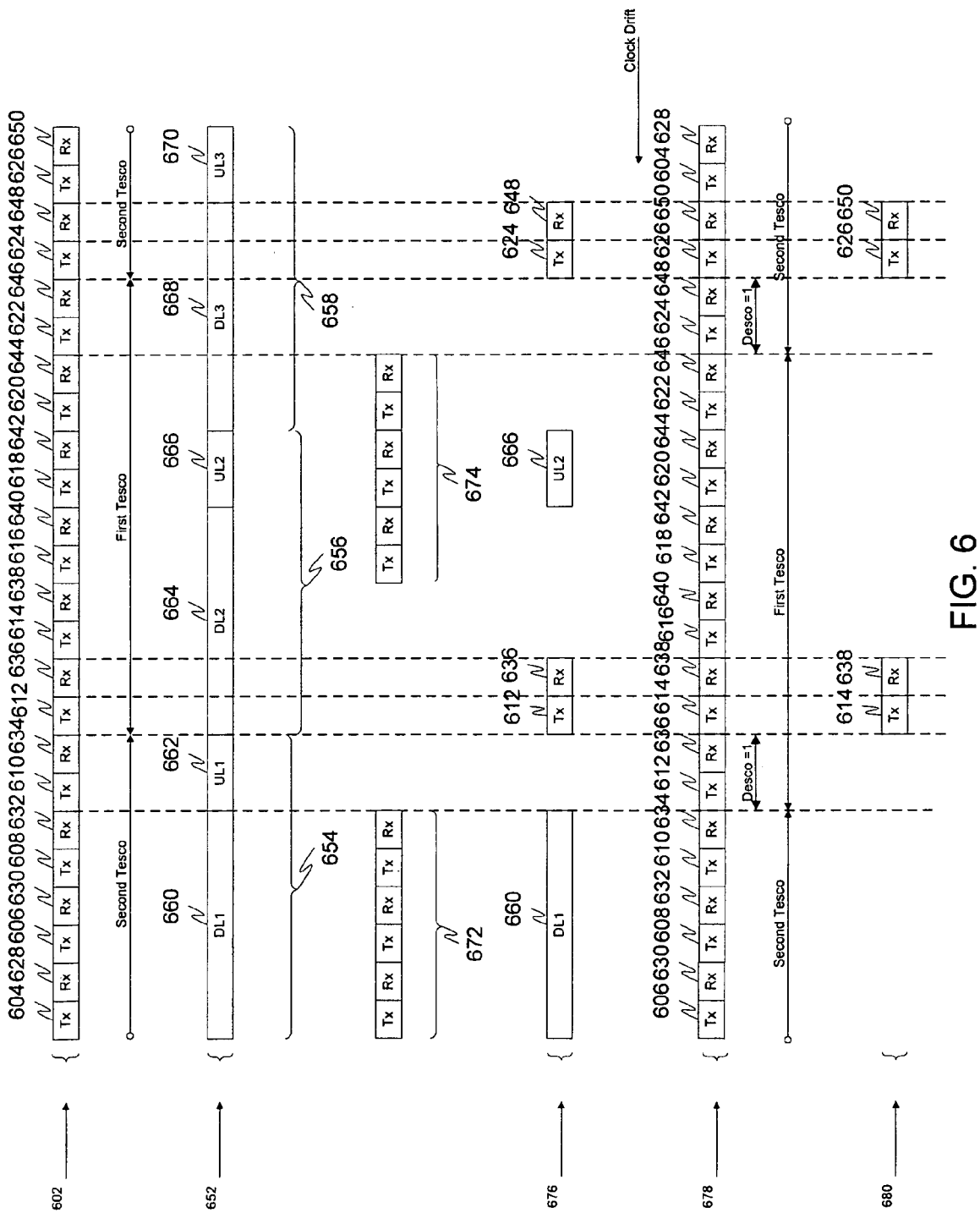
FIG. 6 is a block diagram illustrating scheduling of one or more active periods of Bluetooth relative to one or more inactive periods of WiMAX, in accordance with an exemplary embodiment of the invention.

FIG. 6 is a block diagram illustrating scheduling of one or more active periods of Bluetooth relative to one or more inactive periods of WiMAX, in accordance with an exemplary embodiment of the invention. Bluetooth slot timing structure 602 illustrates the timing of transmission slots and reception slots of Bluetooth. A slot 604, a slot 606, a slot 608, a slot 610, a slot 612, a slot 614, a slot 616, a slot 618, a slot 620, a slot 622, and a slot 624, a slot 626 are transmission slots. Similarly, a slot 628, a slot 630, a slot 632, a slot 634, a slot 636, a slot 638, a slot 640, a slot 642, a slot 644, a slot 646, a slot 648, and a slot 650 are reception slots. Each slot in Bluetooth slot timing structure 602 is 0.625 ms long. The TeSCO interval for Bluetooth slot timing structure 602 includes 12 slots. Therefore, Bluetooth slot timing structure 602 includes two TeSCO intervals. A first TeSCO interval starts from slot 612 and ends at slot 646 and a second TeSCO starts at slot 624 and ends at slot 634. The sequence of Bluetooth slot timing structure 602 repeats periodically with a period of 24 Bluetooth slots. It will be apparent to a person skilled in the art that slot 604, slot 606, slot 608, slot 610 slot 618, slot 630, slot 632, and slot 634 correspond to Bluetooth slots that are repeated after slot 650. For every 12 contiguous slots, each TeSCO interval includes two contiguous reserved slots for transmission and reception. Two contiguous slots form an eSCO slot pair.

Similarly, a WiMAX frame timing structure 652 illustrates three contiguous frames of WiMAX, i.e., (a frame 654, a frame 656, and a frame 658). Each frame includes an UL sub-frame for communicating UL information and a DL sub-frame for communicating DL information. The time duration for a DL sub-frame is approximately 3.75 ms and for a UL sub-frame is approximately 1.25 ms. In the FIG. 6, frame 654 includes a DL sub-frame 660 (DL1) and an UL sub-frame 662 (UL1), frame 656 includes a DL sub-frame 664 (DL2) and an UL sub-frame 666 (UL2), and frame 658 includes a DL sub-frame 668 (DL3) and an UL sub-frame 670 (UL3).

DL sub-frame 660 and UL sub-frame 666 forms a relevant pair of sub-frames since DL sub-frame 660 carries burst allocation information for allocations in sub-frame 666. WiMAX has to receive DL sub-frame 660 to use UL sub-frame 666. Similarly, DL sub-frame 664 and UL sub-frame 670 form a relevant pair of sub-frames and DL sub-frame 668 and UL sub-frame 662 form a relevant pair of sub-frames. The sequence of WiMAX frame timing structure 652 repeats periodically with a period of three contiguous WiMAX frames. Therefore, UL sub-frame 662 corresponds to UL4 (not shown in FIG. 6) which succeeds DL sub-frame 668. FIG. 6 illustrates a set of three WiMAX frames. The period of three WiMAX frames is same as the period of 24 Bluetooth slots.

WiMAX uses a sleep mode supporting co-located coexistence with MAP relevance for co-located coexistence Power Saving Class (PSC) bit set to one, sleep window set to two frames, and listening window set to one frame. In WiMAX frame timing structure 652, frame 654 is a part of a listening window and frame 656 and frame 658 are part of a sleep window.

In the sleep mode supporting co-located coexistence with MAP relevance for co-located coexistence PSC bit set to one, for communication on a WiMAX peer to peer communication link. WiMAX uses all DL sub-frames in a listen window and does not use DL sub-frames in a sleep window. Moreover in such case, WiMAX uses a first UL sub-frame of a first frame of a sleep window and does not use any other UL sub-frame in the sleep window. Also, WiMAX does not use a first UL sub-frame of a first frame of a listen window and uses all other UL sub-frames of the listen window for its communication on the WiMAX peer to peer communication link. Therefore, in WiMAX frame timing structure 652, the communication device uses DL sub-frame 660 and UL sub-frame 666 for communication over the WiMAX peer to peer communication link. Therefore, DL sub-frame 660 represents a first active periods of WiMAX and UL sub-frame 666 represents a second active periods of WiMAX. UL sub-frame 662, DL sub-frame 664, DL sub-frame 668, and UL sub-frame 670 represent inactive periods of WiMAX.

Information about DL sub-frame 660 and UL sub-frame 666 is communicated to second processor 204, which converts the information as a Bluetooth communication event. Information may be timing information of DL sub-frame 660 and UL sub-frame 666. Second processor 204 uses the information to convert timing information of DL sub-frame 660 and UL sub-frame 666 into timing information for eSCO slots. The first active periods of WiMAX, i.e., DL sub-frame 660 is converted into a set of eSCO slot pairs 672 and the second active period of WiMAX, i.e., UL sub-frame 666 is converted to a set of eSCO slot pairs 674. As shown in FIG. 6, length of DL sub-frame 660 is approximately equal to length of six eSCO slots and DL sub-frame 660 after conversion is represented by the eSCO slot pairs 672 that includes 6 eSCO slots. Similarly, length of UL sub-frame 666 is approximately equal to length of two eSCO slots and UL sub-frame 666 after conversion is represented by the eSCO slot pairs 672 that includes six eSCO slots. Time duration of set of eSCO slot pairs 672 may be equal to or greater than time duration of DL sub-frame 660. Similarly, time duration of set of eSCO slot pairs 674 may be equal to or greater than time duration of UL sub-frame 666. Each of set of eSCO slot pairs 672 and set of eSCO slot pairs 674 are discarded by Bluetooth for communication on a Bluetooth peer to peer communication link, since these are reserved slots of an emulated Bluetooth peer to peer communication link.

Thereafter, a native method associated with Bluetooth automatically aligns the active periods of Bluetooth to the inactive periods in WiMAX frame timing structure 652. For example, a DeSCO value of zero is allocated in Bluetooth slot timing structure 602, such that, slot 612 and slot 636 are allocated as eSCO slot pairs in the first TeSCO, as they coincide with one or more parts of DL sub-frame 664 and UL sub-frame 662. Due to periodic nature of eSCO slots, slot 624 and slot 648 are allocated as eSCO slot pairs in the second TeSCO, as they coincide with one or more parts of DL sub-frame 668 and UL sub-frame 670. This is depicted in Bluetooth-WiMAX time sharing structure 676. This pattern of allocating eSCO slot pairs is repeated for subsequent TeSCO's (not shown in FIG. 6).

After allocation of eSCO slot pairs, due to clock drifts, each of the first TeSCO and the second TeSCO of Bluetooth slot timing structure 602 may shift back by two slots as depicted by a Drifted Bluetooth slot timing structure 678. As a result of this drift, slot 612 and slot 636 may interfere with one or more parts of DL sub-frame 660. This may lead to interference between WiMAX and Bluetooth. Therefore, eSCO link renegotiation in Bluetooth may change the DeSCO value of Bluetooth slot timing structure 602 from zero to one as a measure to avoid this interference. The DeSCO value may also be changed in anticipation of this interference as part of eSCO link renegotiation. Slot 614 and slot 638 are allocated as eSCO slot pair in the first TeSCO as shown in FIG. 6. Due to periodic nature of eSCO slots, slot 626 and slot 650 are allocated as eSCO slot pair in the second TeSCO. Automatic link renegotiation in Bluetooth changes the DeSCO value to two in anticipation to ensure that allocated Bluetooth eSCO slots do not interfere with one or more parts of DL sub-frame 660. This is depicted by a Bluetooth link-renegotiated structure 680.

Figure 7:
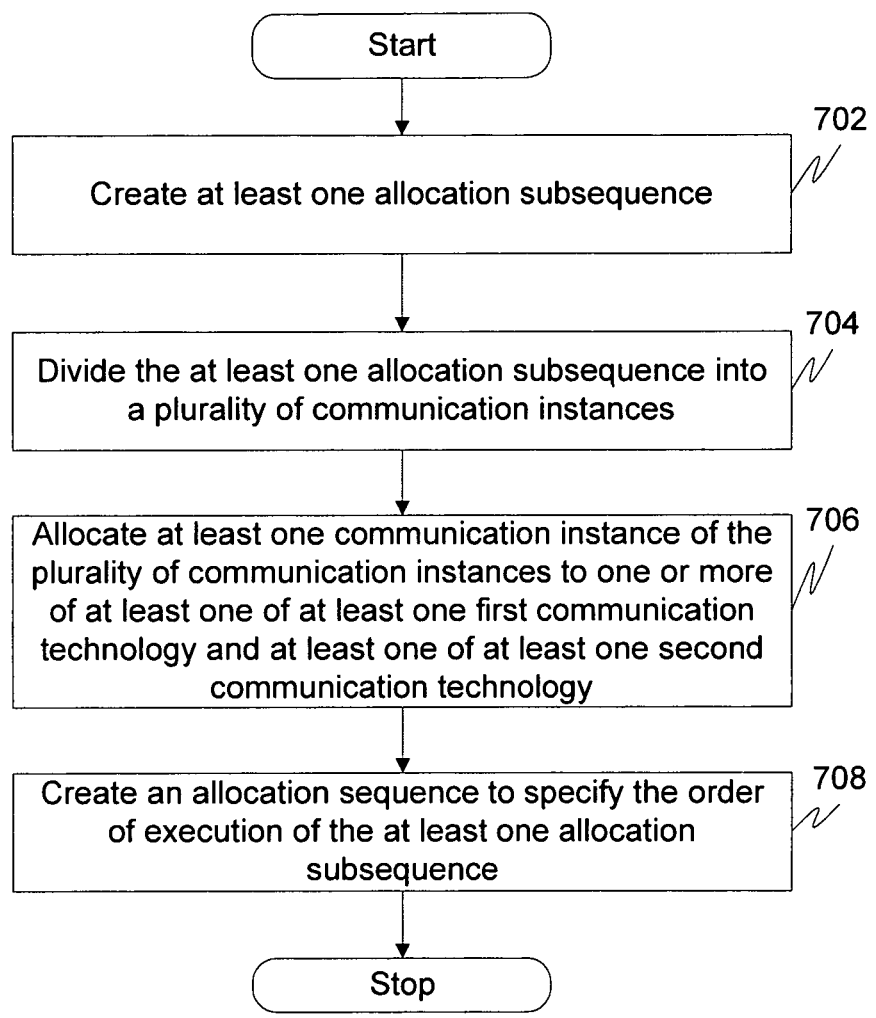
FIG. 7 is a flowchart for a method of creating an allocation sequence, in accordance with an embodiment the invention.

FIG. 7 is a flowchart for a method of creating an allocation sequence, in accordance with an embodiment of the invention. At step 702, second processor 204 creates one or more allocation subsequences based on a first communication event of one or more first communication events associated with a first communication technology of the one or more first communication technologies. The first communication event includes one or more of a timing signal, a communication message, a communication parameter, and a communication procedure. Thereafter, at step 704, second processor 204 divides the one or more allocation subsequences into a plurality of communication instances. Each communication instance of the plurality of communication instances has a predetermined time duration. Each communication instance of the plurality of communication instances may have equal time durations. Alternatively, each communication instance of the plurality of communication instances may have unequal time durations.

At step 706, second processor 204 allocates one or more communication instances of the plurality of communication instances to at least one of one or more of the one or more first communication technologies and one or more of one or more second communication technologies based on predefined criteria. In an embodiment, the predefined criteria may be one or more of a communication protocol requirement and an application service requirement, and a communication priority requirement of one or more of the one or more first communication technologies and the one or more second communication technologies. A communication instance of the one or more communication instances allocated to a first communication technology of the one or more first communication technologies is an inactive period for the one or more second communication technologies. The one or more second communication technologies discard the inactive period for communication on one or more second peer to peer communication link of the one or more second communication technology. Similarly, a communication instance of the one or more communication instances unallocated to the first communication technology is an active period for the one or more second communication technologies. A second communication technology of the one or more second communication technologies uses the active period for communication.

At step 708, second processor 204 creates an allocation sequence to specify the order of execution of the one or more allocation subsequences based on predetermined criteria. In an embodiment, the predetermined criteria is priority associated with one or more of the one or more first communication technologies and the one or more second communication technologies. In another embodiment, the predetermined criteria is priority associated with communication data of one or more of the one or more first communication technologies and the one or more second communication technologies. For example, an allocation sequence can have one or more allocation subsequences that repeat after at least 2.55 s. Based on a state of a communication device, one of the plurality of communication technologies act as a scheduling master and other communication technologies act as scheduling slaves. The master transmits scheduling information to one or more slaves. The scheduling information includes information about the allocation sequence. For example, when WiMAX is the master, WiMAX can transfer the scheduling information to WLAN and Bluetooth. In the same manner, when WLAN is the master, WLAN will transfer the scheduling information to WiMAX and Bluetooth. This is further explained in conjunction with FIG. 8.

It will apparent to a person skilled in the art that the one or more first communication technologies may create the allocation sequence and communicate to second processor 204. It will also be apparent to a person skilled in the art that different processors may be used for converting the one or more first communication events to one or more second communication events and for creating the one or more allocation subsequences.

Figure 8:
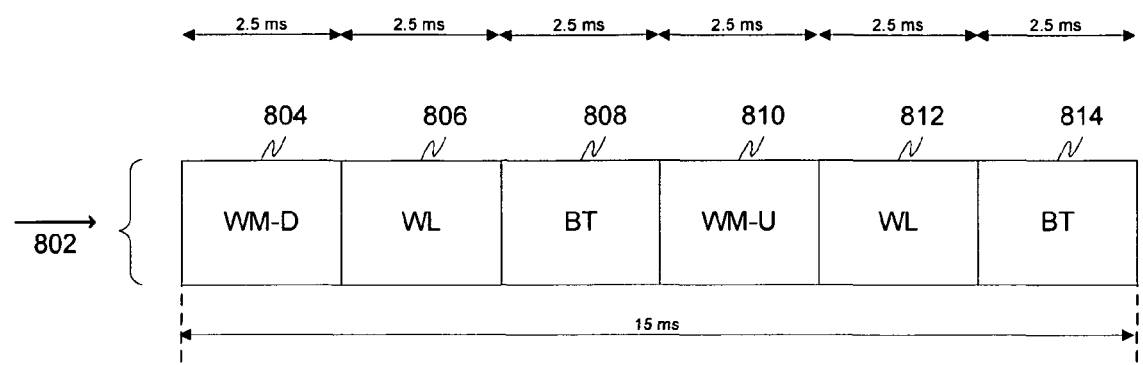
FIG. 8 is a block diagram illustrating an allocation subsequence that enables coexistence of WiMAX, Bluetooth, and WLAN on a communication device, in accordance with an exemplary embodiment of the invention.

FIG. 8 is a block diagram illustrating an allocation subsequence 802 that enables coexistence of WiMAX, Bluetooth, and WLAN on a communication device, in accordance with an exemplary embodiment of the invention. Allocation subsequence 802 has a time duration of 15 ms. For enabling coexistence of WiMAX, Bluetooth, and WLAN in the communication device, allocation subsequence 802 is divided into six communication instances (a communication instance 804, a communication instance 806, a communication instance 808, a communication instance 810, a communication instance 812, and a communication instance 814), such that, each communication instance of allocation subsequence 802 is equal to 2.5 ms. As shown in the FIG. 8, communication instance 804 is allocated to WiMAX for downlink reception (WM-D) and communication instance 810 for uplink transmission (WM-U), communication instance 806 and communication instance 812 are allocated to WLAN, communication instance 808 and communication instance 814 are allocated to Bluetooth. Therefore, allocation subsequence 802 is time shared between WiMAX, Bluetooth and WLAN. Allocation of each communication instances of allocation subsequence 802 to one or more of WiMAX, WLAN and Bluetooth is based on predefined criteria, that Bluetooth is allocated one or more communication instances every 7.5 ms, thereby, enabling Bluetooth to use TeSCO=12 for communication. Therefore, Bluetooth is allocated communication instance 808 and communication instance 814 in allocation subsequence 802. Similarly for WiMAX, the length of a frame is 5 ms. Moreover, in WiMAX, if a device uses DL of a first frame, then the device uses UL of the subsequent frame. Therefore, WiMAX is allocated communication instance 805 and communication instance 810 in allocation subsequence 802. WiMAX is allocated two communication instances in every 15 ms. Allocation subsequence 802 is repeated indefinitely for enabling coexistence between WiMAX, Bluetooth and WLAN.

Figure 9:
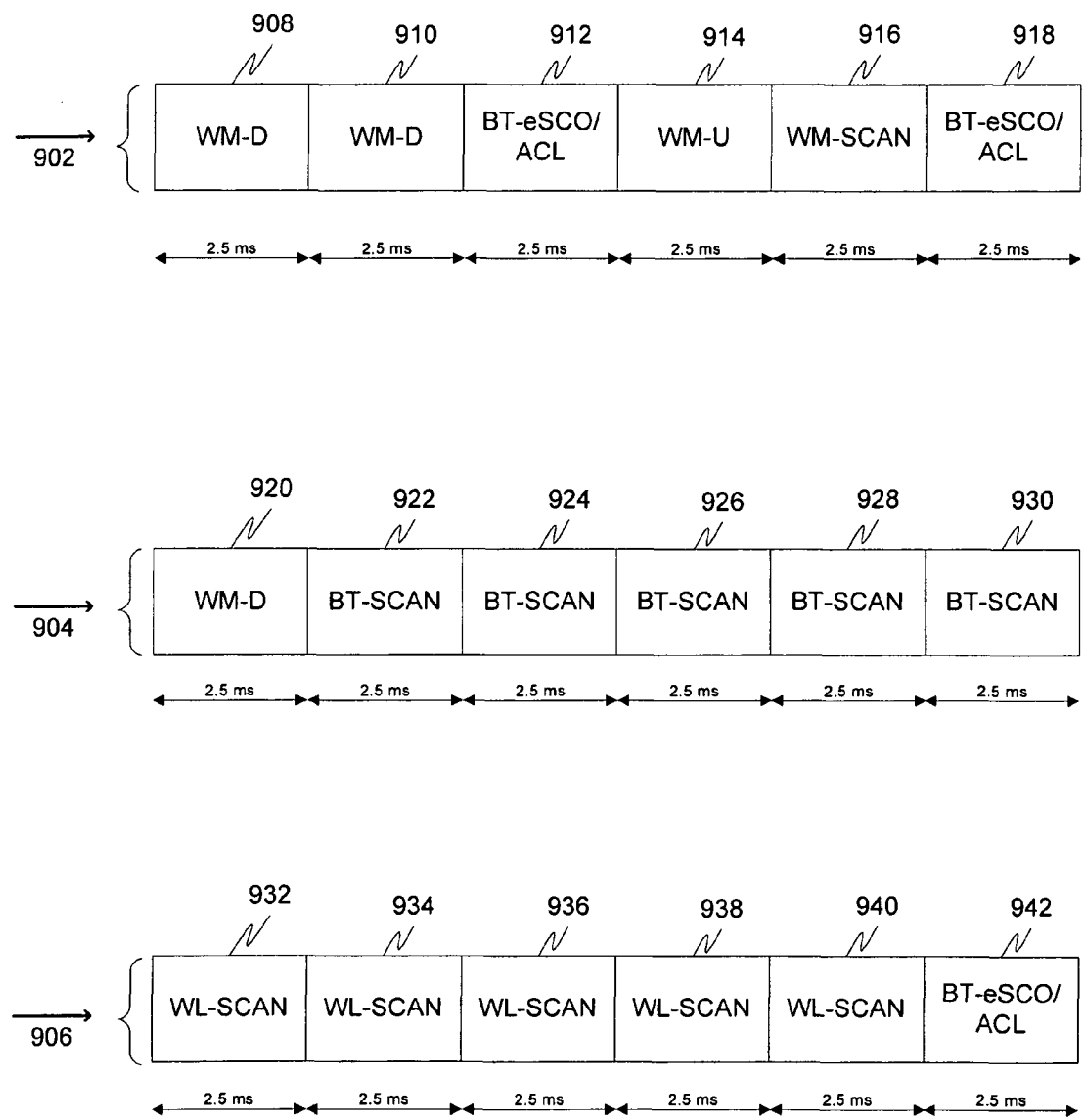
FIG. 9 illustrates a first allocation subsequence, a second allocation subsequence, and a third allocation subsequence to enable a coexistence state for WiMAX, WLAN and Bluetooth, in accordance with an exemplary embodiment of the invention.

FIG. 9 illustrates an allocation subsequence 902, an allocation subsequence 904, and an allocation subsequence 906 to enable a coexistence state of WiMAX, WLAN and Bluetooth, in accordance with an exemplary embodiment of the invention. In allocation subsequence 902, WiMAX requires to transmit/receive data/voice and perform scanning, WLAN requires to perform scanning, and Bluetooth requires to transmit/receive data/voice and perform scanning In the coexistence state, WiMAX acts as a scheduling Master. Activity of WLAN is restricted to scanning. WiMAX transmits an allocation sequence to each of WLAN and Bluetooth. The allocation sequence specifies order of executing allocation subsequence 902, allocation subsequence 904 and allocation subsequence 906. The allocation sequence is explained in detail in FIG. 10.

Allocation subsequence 902 in the allocation sequence has a time duration of 15 ms and is divided into six communication instances (a communication instance 908, a communication instance 910, a communication instance 912, a communication instance 914, a communication instance 916, and a communication instance 918). Communication instance 908 and communication instance 910 are allocated to WiMAX for downlink (WM-D), communication instance 912 and communication instance 918 are allocated to Bluetooth for one or more of eSCO and ACL (BT-eSCO/ACL), communication instance 914 is allocated to WiMAX for uplink (WM-U), communication instance 916 is allocated to WiMAX for scanning (WM-SCAN). Similarly, allocation subsequence 904 is divided into six communication instances (a communication instance 920, a communication instance 922, a communication instance 924, a communication instance 926, a communication instance 928, and a communication instance 930), such that, Bluetooth gets 12.5 ms for scanning. Communication instance 920 in allocation subsequence 904 is allocated to WiMAX for downlink (WM-D), and communication instance 922 through communication instance 930 are allocated to Bluetooth for scanning (BT-SCAN). In the same manner, allocation subsequence 906 is divided into six communication instances (a communication instance 932, a communication instance 934, a communication instance 936, a communication instance 938, a communication instance 940, and a communication instance 942), such that, WLAN gets 12.5 ms for scanning. Communication instance 932 through communication instance 940 in allocation subsequence 906 are allocated to WLAN for scanning (WL-SCAN), and communication instance 942 is allocated to Bluetooth for one or more of SCO and ACL (BT-SCO/ACL). In the above description, a communication device emulates WiMAX peer to peer communication links and WLAN peer to peer communication links as one or more emulated Bluetooth peer to peer communication links which automatically aligns SCO/eSCO slots using the one or more native methods of Bluetooth such that SCO/eSCO slots and communication instances allocated to WiMAX and WLAN in allocation subsequence 902, allocation subsequence 904, and allocation subsequence 906 have least overlap (and hence interference). This has been explained in detail in conjunction with FIG. 5.

Figure 10:
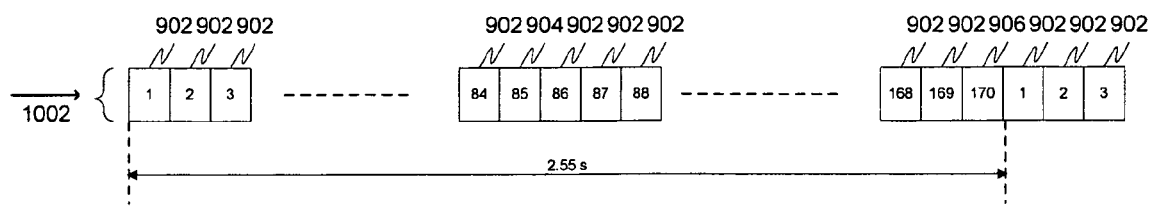
FIG. 10 illustrates an allocation sequence that includes a first allocation subsequence, a second allocation subsequence, and a third allocation subsequence used in the coexistence state, in accordance with an exemplary embodiment of the invention.

FIG. 10 illustrates an allocation sequence 1002 that includes allocation subsequence 902, allocation subsequence 904 and allocation subsequence 906 used in the coexistence state, in accordance with an exemplary embodiment of the invention. Allocation sequence 1002 is created for specifying the order of execution of allocation subsequence 902, allocation subsequence 904, and allocation subsequence 906 in the coexistence state based on predetermined criteria. As WiMAX acts as the scheduling master in the coexistence state, WiMAX communicates allocation sequence 1002 to Bluetooth and WLAN specifying the order of execution of allocation subsequence 902, allocation subsequence 904, and allocation subsequence 906. As shown in the FIG. 10, allocation sequence 1002 has time duration of 2.55 s. The predetermined criteria here is to ensure that in allocation sequence 1002, Bluetooth is allocated 12.5 ms for periodically (once in 2.55 seconds) performing Bluetooth scanning and WLAN is allocated 12.5 ms time for periodically (once in 2.55 seconds) performing WLAN scanning.

Various embodiments of the invention provide system and method for enabling coexistence between a plurality of communication technologies on a communication device. The method minimizes interference between the plurality of communication technologies. Further, a first communication event of a first communication technology is emulated as a second communication event of a second communication technology. A native method associated with the second communication technology automatically aligns the active periods of the first communication technology relative to the active periods of the second communication technology, such that they do not interfere. The method eliminates the need for clock synchronization between the plurality of communication technologies and does not require the communication device to toggle between a master state and a slave state when the second communication technology is Bluetooth. Further, the method does not get impacted due to clock drift that occurs in Bluetooth networks. The method can also be used with the de-facto three wire interface used for enabling coexistence of WLAN and Bluetooth, such that, even the state of WiMAX, i.e., active or inactive, does not have an impact on the de-facto three wire interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for enabling coexistence of a plurality of communication technologies on a communication device, comprising:
   receiving a first communication event corresponding to a first communication technology of the plurality of communication technologies; and
   converting the first communication event to a second communication event, wherein the second communication event corresponds to a second communication technology of the plurality of communication technologies, wherein the converting emulates a first peer to peer communication link of the first communication technology as an emulated second peer to peer communication link of the second communication technology.

2. The method of claim 1, wherein the first communication event is a first peer to peer communication event corresponding to the first communication technology.

3. The method of claim 1, wherein the first communication event corresponds to one of a Downlink (DL) sub-frame and an Uplink (UL) sub-frame.

4. The method of claim 1, wherein each first communication event and each second communication event comprises at least one of a timing signal, a communication message, a communication parameter, and a communication procedure.

5. The method of claim 4, wherein the communication message is at least one of a Mobile Sleep Request (MOB_SLP-REQ), a Mobile Sleep Response (MOB_SLP-RSP), a Mobile Scan Request (MOB_SCN-REQ), and a Mobile Scan Response (MOB_SCN-RSP).

6. The method of claim 4, wherein the communication message is at least one of a Link Manager Protocol Synchronous Connection Oriented Link Set Up Request (LMP_SCO_link_req), a Link Manager Protocol Synchronous Connection Oriented Link Remove Request (LMP_remove_SCO_link_req), a Link Manager Protocol Enhanced Synchronous Connection Oriented Link Set Up Request (LMP_$_{eSCO}$_ink_req), a Link Manager Protocol Enhanced Synchronous Connection Oriented Link Remove Request (LMP_remove_eSCO_link_req), a Sniff Request (LMP_sniff_req), an Unsniff Request (LMP_unsniff_req), a Sniff Subrating Request (LMP_sniff_subrating_req), a Sniff Subrating Response (LMP_sniff_subrating_res), a Hold (LMP_hold), and a Hold Request (LMP_hold_req).

7. The method of claim 1, wherein each second communication event corresponds to one of a Synchronous Connection Oriented (SCO) slot pair, an enhanced Synchronous Connection Oriented (eSCO) slot pair, a sniff slot, a park beacon, and a hold period, the second communication technology discarding each second communication event for communication on a second peer to peer communication link of the second communication technology.

8. The method of claim 1, wherein a communication technology of the plurality of communication technologies is one of Wireless Metropolitan Area Network (WivlAN), Wireless Local Area Network (WLAN), Worldwide Interoperability for Microwave Access (WiMAX), and Bluetooth.

9. The method of claim 1, wherein the second communication event is a peer to peer communication event corresponding to the second communication technology.

10. The method of claim 1, wherein the first communication event indicates an active period of the first communication technology.

11. The method of claim 10, wherein the first communication technology schedules in the active period on the first peer to peer communication link of the first communication technology.

12. The method of claim 1, further comprising:
   performing at least one of a link setup, a link renegotiation, a link removal, a Sniff Request, an Unsniff Request, a Hold Request, a Sniff Subrating Request, and a Sniff Subrating Response to update a link parameter associated with the second communication technology.

13. The method of claim 12, wherein the link parameter is one of a Synchronous Connection Oriented offset (DSCO), an enhanced Synchronous Connection Oriented offset (DeSCO), an enhanced Synchronous Connection Oriented time interval (TeSCO), an enhanced SCO retransmission Window (WeSCO), a master to slave eSCO packet type, a slave to master eSCO packet type, a master to slave packet length, a slave to master packet length, a sniff interval (Tsniff), a sniff offset (Dsniff), a sniff attempt, a sniff timeout, a hold time, a hold instant, and a sniff subrating parameter.

14. The method of claim 1, further comprising creating an allocation subsequence based on the first communication event.

15. The method of claim 14, further comprising:
   dividing the allocation subsequence into a plurality of communication instances, each communication instance of the plurality of communication instances corresponding to a predetermined time duration; and
   allocating a communication instance of the plurality of communication instances to at least one of the first communication technology and the second communication technology based on predefined criteria.

16. The method of claim 15, wherein the predefined criteria is at least one of a communication protocol requirement or an application service requirement of the first communication technology and the second communication technology.

17. The method of claim 15, wherein the predefined criteria is a communication priority requirement of at least one of the first communication technology and the second communication technology.

18. The method of claim 15, further comprising:
   creating an allocation sequence specifying the order of executing the allocation subsequence based on a predetermined criteria.

19. The method of claim 15, wherein a communication instance allocated to the first communication technology corresponds to an inactive period for the second communication technology, the second communication technology discarding the inactive period for communication on a second peer to peer communication link of the second communication technology.

20. The method according to claim 15, wherein a communication instance unallocated to the first communication technology corresponds to an active period for the second communication technology, the second communication technology using the active period for communication on a second peer to peer communication link of the second communication technology.

21. The method of claim 14, further comprising over allocating a resource to one or more of the first communication technology and the second communication technology.

22. The method of claim 14, further comprising over-requesting for a resource by at least one of the first communication technology and the second communication technology.

23. The method of claim 22, wherein the resource is at least one of time duration or frequency.

24. The method of claim 1, further comprising providing information corresponding to the second communication technology to the first communication technology.

25. The method of claim 24, wherein the information comprises at least one of a timing of a beacon signal and a periodicity of the beacon signal associated with the second communication technology.

26. The method of claim 24, wherein at least one of an inactive period and an active period of at least one of the first communication technology and the second communication technology is deteitnined based on the information.

27. The method of claim 24, further comprising creating an allocation sequence based on the information.

28. An apparatus for enabling coexistence of a plurality of communication technologies, comprising:
a first processor configured to receive a first communication event from a first communication technology of the plurality of communication technologies; and
a second processor operatively coupled to the first processor and configured to convert the first communication event to a second communication event of a second communication technology of the plurality of communication technologies, wherein the converting emulates a first peer to peer communication link of the first communication technology as an emulated second peer to peer communication link of the second communication technology.

29. The apparatus of claim 28, wherein the first communication event is a first peer to peer communication event corresponding to the first communication technology.

30. The apparatus of claim 28, wherein the second communication event is a peer to peer communication event corresponding to the second communication technology.

31. The apparatus of claim 28, wherein the first communication event indicates an active period of the first communication technology.

32. The apparatus of claim 28, wherein the first communication event corresponds to one of a Downlink (DL) sub-frame and an Uplink (UL) sub-frame.

33. The apparatus of claim 28, wherein the first communication event and the second communication event comprise at least one of a timing signal, a communication message, a communication parameter, and a communication procedure.

34. The apparatus of claim 28, wherein the second communication event corresponds to one of a Synchronous Connection Oriented slot pair (SCO), an enhanced Synchronous Connection Oriented slot pair (eSCO), a Sniff slot, a park beacon, and a hold period, the second processor discarding the second communication event for communication on a second peer to peer communication link of the second communication technology.

35. The apparatus of claim 28, wherein the second processor is further configured to create an allocation subsequence based on the first communication event.

36. The apparatus of claim 35, wherein the second processor is further configured to: divide the allocation subsequence into a plurality of communication instances, where each communication instance corresponds to a predetermined time duration; and allocate at least one communication instance to the first communication technology and the second communication technology based on predefined criteria.

37. The apparatus of claim 36, wherein the second processor is further configured to create an allocation sequence specifying the order of executing the allocation subsequence based on the predetermined criteria.

38. The apparatus of claim 35, wherein the second processor is further configured to overallocate at least one resource to the first communication technology and the second communication technology.

39. The apparatus of claim 35, wherein the second processor is further configured to over-request for at least one resource for at least one of the first communication technology and the second communication technology.

40. The apparatus of claim 39, wherein the at least one resource is at least one of time duration and frequency.

41. The apparatus of claim 28, wherein the second processor is further configured to provide information corresponding to the second communication event to the first communication technology.

42. The apparatus of claim 41, wherein the information comprises at least one of a timing of a beacon signal and a periodicity of the beacon signal associated with the second communication technology.

43. The apparatus of claim 28, wherein the apparatus is a mobile station comprising a transceiver associated with the plurality of communication technologies.

44. The apparatus of claim 43, wherein the transceiver is associated with a communication technology of the plurality of communication technologies.

* * * * *

UNITED STATES PATENT AND TRADEMARK OFFICE
CERTIFICATE OF CORRECTION

PATENT NO. : 8,619,732 B2  
APPLICATION NO. : 12/380338  
DATED : December 31, 2013  
INVENTOR(S) : Khairmode et al.

Page 1 of 1

It is certified that error appears in the above-identified patent and that said Letters Patent is hereby corrected as shown below:

In the Claims

Column 17, Line 65, Claim 6, replace "(LMP_eSCO_ink_req)" with --(LMP_eSCO_link_req)--.

Column 18, Line 15, Claim 8, replace "(WivIAN)" with --(WMAN)--.

Column 19, Line 35, Claim 26, replace "technology is deteitnined" with --technology is determined--.

Signed and Sealed this  
First Day of April, 2014

Michelle K. Lee  
*Deputy Director of the United States Patent and Trademark Office*